Aug. 28, 1962 H. MASSEY 3,050,922
COTTON SALVAGING MACHINES
Filed Jan. 6, 1961 3 Sheets-Sheet 1

INVENTOR.
Hubert Massey
BY Scott L. Norvell
atty

Aug. 28, 1962  H. MASSEY  3,050,922
COTTON SALVAGING MACHINES
Filed Jan. 6, 1961  3 Sheets-Sheet 2

INVENTOR.
Hubert Massey
BY Scott L. Horriel
Atty

Aug. 28, 1962  H. MASSEY  3,050,922
COTTON SALVAGING MACHINES
Filed Jan. 6, 1961  3 Sheets-Sheet 3

INVENTOR.
Hubert Massey
BY Scott L. Norviel
Atty

United States Patent Office 3,050,922
Patented Aug. 28, 1962

3,050,922
COTTON SALVAGING MACHINES
Hubert Massey, Rte. 1, Box 143, Gilbert, Ariz.
Filed Jan. 6, 1961, Ser. No. 81,182
4 Claims. (Cl. 56—12)

This invention concerns a cotton salvaging machine.

One of the objects of the invention is to pick up and remove tufts of cotton which have been knocked down from the plants by mechanical picking machines and transferring these tufts to a cage for removal from the field to the gin.

Another object of the invention is to provide a machine for picking up tufts and bolls of cotton from the ground and from the plants where they are sticking, after having been dislodged from the cotton bolls on the plants.

Still another object is to provide a machine for removing cotton from the ground and from plants which have been knocked down by mechanical pickers; said machine, including means for dislodging the cotton tufts and open bolls from the place of their embedment so that they may be picked up by air suction with a minimum of trash and dirt.

Another object of the invention is to provide means for dislodging tufts and bolls of downed cotton from the ground and from parts of the plants so that they are easily picked up by air suction a distance from the ground and from the plants whereby the air suction does not pick up sticks and dirt and particles of leaves and mix them with the cotton salvaged whereby the cotton transferred to the gin by the machine is down-graded.

Still another object of the invention is to provide a means for keeping the suction pipes clear and clean of accumulated cotton tufts whereby they become overloaded or clogged so as to prevent free suction action.

Other objects will appear hereinafter.

I attain the foregoing objects by means of the devices, parts and combinations of parts as shown in the accompanying drawings, in which—

Similar numerals refer to similar parts in the several views.

Figure 1:
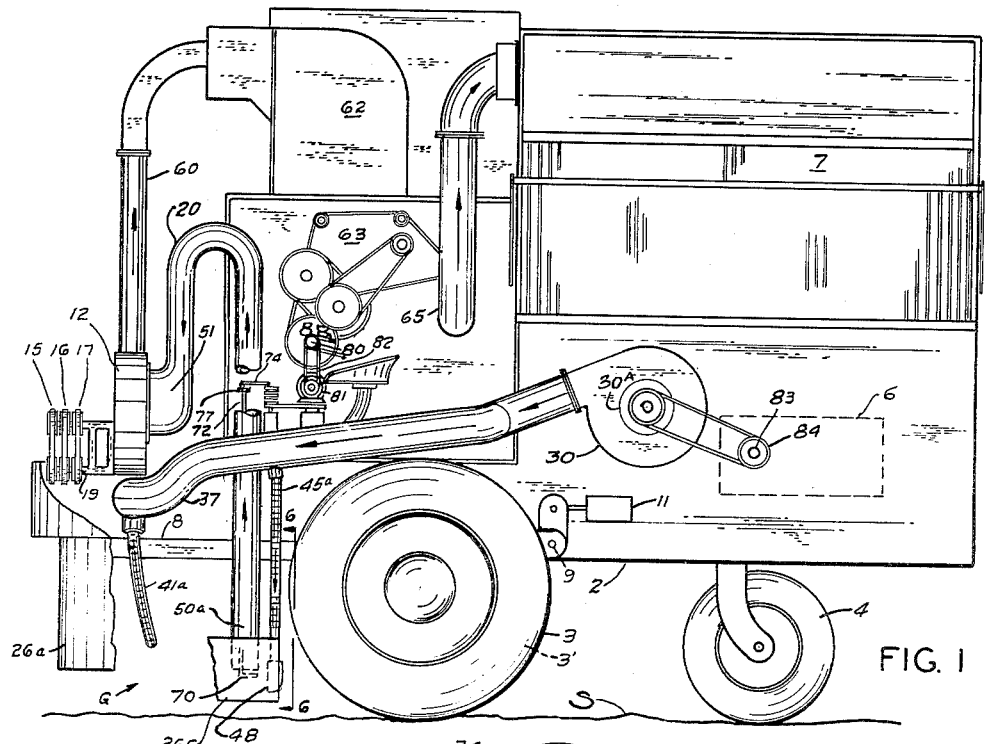
FIGURE 1 is a side elevational view of a cotton salvaging machine embodying my improvements.
Figures 4, 5:
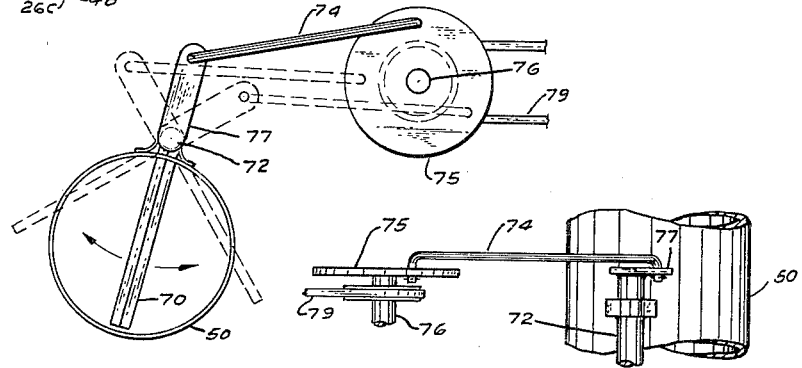
FIGURE 4 is a plan view of a typical air suction pipe looking downward through the pipe and showing the means for removing the accumulation of wadded cotton from the lower end opening of the pipe.
FIGURE 5 is a side elevational view of the device shown in FIGURE 4, showing the means for driving the wad dislodging apparatus.
Figure 6:
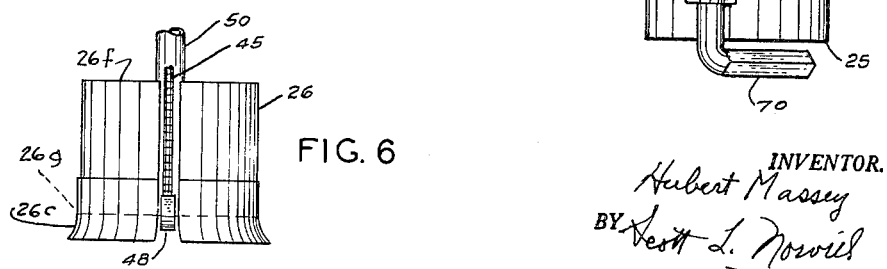
FIGURE 6 is a rear view of one of the hoods showing the location of the air blowing pipe and the suction pipe.
Figure 3:
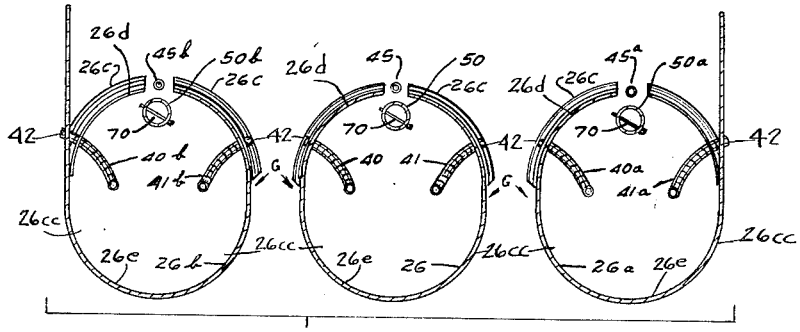
FIGURE 3 is a horizontal section taken substantially on line 3—3 of FIGURE 2 and showing the arrangement of portions of the hood and air pressure pipes, as well as suction pipes.
Figures 7, 8:
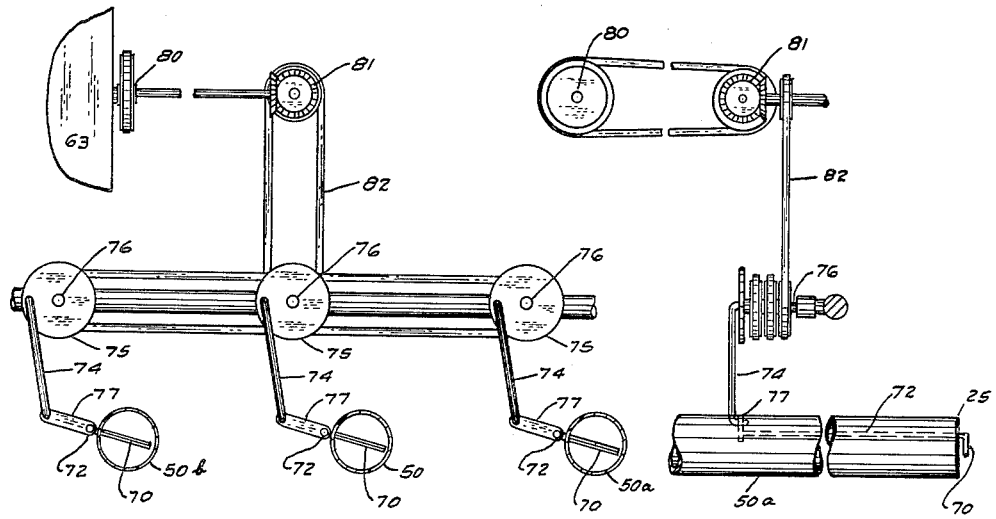
FIGURE 7 is a plan view of the mechanism which operates the sweep arms on the cotton pick up suction pipes.
FIGURE 8 is a side elevational view of the mechanism shown in FIGURE 7.
Figure 9:
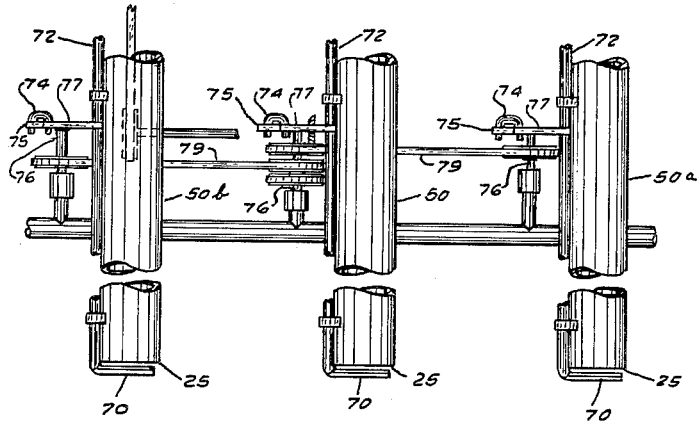
FIGURE 9 is a front elevational view of the mechanism shown in FIGURE 7.

Referring to FIGURE 1, it is to be noted that the entire machine body 2 is mounted on two driving wheels 3 and 3'. Whereas the left hand front wheel is shown and marked FIGURE 3, it is to be understood that the right hand wheel marked 3' is a right hand counter part of the left wheel.

In back of the driving wheels 3 and 3' there is a caster type steering and rear support wheel 4.

Within the body there is an engine 6 to furnish motive power for the machinery hereinafter mentioned and to drive the wheels 3 and 3' and to otherwise act as a prime mover for the various machine parts. The engine is positioned approximately centrally in the body and above and to the rear of the engine there is a cotton receiving cage 7 which is of the conventional type used on conventional cotton picking machines and is well known to the art.

At the front of the machine body 2 there are three blowers 12, 13 and 14, mounted on sub-frame 8 which is pivotally attached at 9 to body 2 to provide vertical adjustment for the front end of the sub-frame 8. The sub-frame 8 is raised and lowered by hydraulic jack 11. The blowers are driven by belts 15, 16 and 17, which are, in turn, driven by a pulley 18 on shaft 19, connected to the engine 6. These blowers have inlet pipes 21, 20 and 22 which are connected with and lead to the suction pipes 50, 50a, and 50b through which the cotton is picked up.

Figure 2:
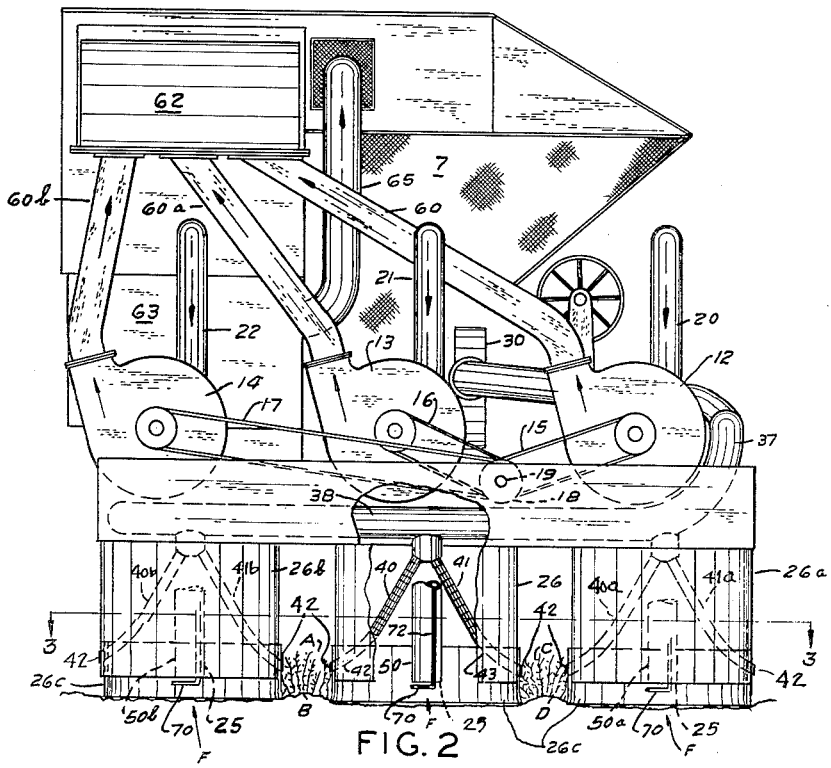
FIGURE 2 is a front elevational view thereof.

In FIGURE 2 the center hood 26 is shown broken away to illustrate the position of the suction end 50 of pipe 21. In the hoods 26a and 26b, on each side of the center hood 26, the suction pipes 50a and 50b are indicated by dotted lines only.

The hoods 26, 26a and 26b are each substantially oval or ovoidal in shape when viewed from above, as in a plan view and have rounded front ends 26e, rounded rear ends 26d and vertical sides 26cc, and are opened at their tops 26f and along the bottom edges 26g. The bottom edges 26g normally run close to the surface S of the earth on the field over which the machine is operated. Each hood substantially encloses the ground surface within the perimeter of its lower edge so that the cotton tufts dislodged and disturbed by air blasts incident to the operation of the machine, and blowers 30 and blower pipes 40a, 41a, 45, 45a and 45b will not be scattered, but will be confined within the hood where they can be picked up by suction pipes 50b, 50 and 50a.

A special blower 30 in the center body part provides a draft of air which is drawn through blower inlets 30a and forced out through outlets pipe 37. This pipe extends forwardly of the body and is connected to a transverse manifold pipe 38 which extends across the front of the machine. From this pipe there are branch pressure pipes 40 and 41 (as shown in the hood 26) which extend outward through the lower part of the sides of hood 26. Air issuing from the lower end openings 42 is directed transversely onto the plants A in cotton row B and from opening 43 onto the plnats C in cotton row D. Air issuing from these pipes tends to dislodge any loose cotton tufts or bolls that may be on the ground or in between the plants. A further pressure pipe 45a, branches from the forwardly extending pipe 37 and extends downward to an outlet at 48 which is in the proximate middle of each hood. Air issuing from this pipe tends to disturb, dislodge and blow any loose cotton that may be in the area between the rows B and D. These drafts of air make it possible for the suction pipes 50a, 50 and 50b to gather up the loose cotton within the ditch area F which is covered by the hood.

In addition to the air pressure and blowing pipes, above mentioned, there are suction pipes 50, 50a and 50b in the rear portion of each hood. These suction pipes are connected to the air inlet pipes 20, 21, 22 of the blowers 13, 12 and 14.

It is to be understood that there are air outlet or blowing pipes, as above described, in each of the hoods 26, 26a and 26b and suction pipes 50a and 50b disposed, as above described. The suction pipe to the right is marked 50a and the pipe to the left is marked 50b. The blower pipes 40a, 41a and 45a are in the right hood and pipes 40b, 41b and 45b are in the left hood.

At times the cotton tends to bunch up and form comparatively large wads that partially close the lower ends 25 of the suction pipes 50, 50a and 50b.

In order to dislodge the accumulated cotton of these wads I provide a sweep or scraper arm 70 for each suction pipe. These arms operate on vertical shafts 72 which are attached to the side of the suction pipes and are given reciprocating motion by the rods 74 which are driven crankwise by the crank plates 75 on shafts 76. The rods 74 are connected to cranks 77 on shafts 72. Shaft 76 is driven by belts 79 connected through gears 81 and belt 82 to drive shaft 80, which is one of the operating shafts of cleaner 63.

The reciprocating motion given each sweep arm 70 cuts across the open end of each suction pipe 50 continuously and keeps cotton from balling up and forming a wad at this position.

It is to be understood that there is similar construction at the bottom end of each of the three suction pipes 50, 50a and 50b, previously shown.

The air, after entering and leaving each of the blowers 12, 13 and 14, is transferred through exit pipes 60, 60a and 60b to the inlet receiver 62 of a cotton cleaner 63. This cotton cleaner is of conventional construction and is of the same type used in cotton gins and is well known to the art.

From the cotton cleaner the air, with cotton entrained, exits through pipe 65 and is transferred to the cage 7.

It will be noted that the hoods 26, 26a and 26b are arranged on the front of the entire machine body so that they run in the ditch area F between the plant rows A and C, etc. A flexible strip 26c runs near the earth at the rear of each hood. At the middle the hoods are off the ground as at G, so that cotton may be blown under the central lower edge of the hood and into the area within it. The machine will handle all of the two rows shown, as well as a part of the loose cotton in rows positioned adjacent to the outside hoods 26a and 26b at one pass.

In use the machine is driven through a field having rows of cotton with certain rows, such as A and C, included between the hoods as shown. One trip down the rows is termed a "pass." After a trip down the rows A and C as shown the machine is moved to the left or to the right, as desired, and two other rows are included between the adjacent hoods. This process is continued until all rows have been cleaned.

It is to be noted that the principal improved operation of this machine is due to the structure which forces air over the ground area where the plants are growing and the ground around them, and into the plants also, in order to dislodge loose cotton (sometimes called "down cotton") and into the area within each hood, so that this cotton is immediately sucked up by the blowers at the front of the machine and carried into the cleaner 63 and then carried into the bin or cage 7 for transport to the gin.

Figure 10:
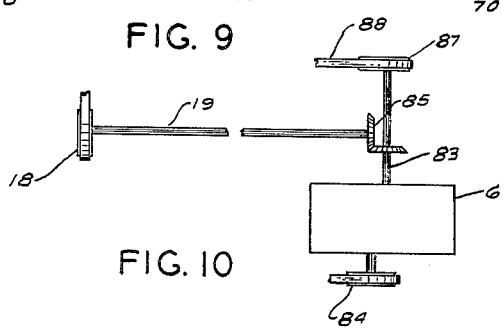
FIGURE 10 is a semi-diagrammatic drawing of a portion of the power transmitting apparatus.

It is to be noted that in FIGURE 10 transmission of the power from the engine 6 to several of the component parts is illustrated. Thus, the pulley 18, which drives shaft 19, is driven through bevel 85 by motor shaft 83. Also note that the pulley 89 on cleaner 63 is driven by belt 88 from pulley 87 on motor shaft 83. It is also noted that pulley 84 drives a belt leading to the drive shaft of blower 30 and that the pulley is driven by motor shaft 83. (See FIGURES 1 and 10.)

The front end of the subframe 8 is raised and lowered by hydraulic cylinder 11. The subframe pivots on pins 9 attached to the base of the main frame 2. In this way the front end may be raised sufficiently so that the whole machine may be run over the ground, with the hoods above ground level.

Cotton salvaged in this manner is comparatively clean and free from debris and dirt and is accepted at the gin at a superior rating.

From the foregoing it will be understood that the hoods 26, 26a and 26b confine the loose cotton disturbed by the drafts from blow pipes 40 and 41 and from the forwardly directed exit opening 48 of blow pipe 45. While this loose cotton is disturbed it is drawn into the suction pipes 50a, 50, 50b. The drafts from the blow pipes lift the cotton from the ground or plants where it is resting, but do not disturb or lift leaves, stems or other field trash to any appreciable extent.

I claim:

1. A cotton salvaging machine composed of a self propelled tractive implement having a body, an engine thereon, a cotton cleaner and a cotton receiving cage, suction fans having inlet and exhaust pipes, a blower fan mounted on said frame, a plurality of hoods having side walls and rounded front and rear ends disposed on the front of the body with their lower edges normally disposed slightly above the surface of the earth of the cotton field over which the implement is moved, vertically extending suction pipes having their lower ends near the surface of the earth, and disposed within the rear portion of said hoods, connected to the inlet pipes of said suction fans, pipes connecting the outlet pipes of said fans to the inlet of said cotton cleaner and a pipe connecting the outlet pipes of said cotton cleaner with said cotton receiving cage; blow pipes connected to said blower fan and opening nearer ground level at the rear of each hood to direct a stream of air over the earth and lift cotton tufts from the ground and urge them toward the ends of said suction pipes; blow pipes connected to said blower fan having outlet openings disposed to direct a draft of air transversely over the ground between said hoods and carry cotton tufts toward adjacent suction pipe openings.

2. The machine as described in claim 1 wherein the ends of the suction pipes are provided with mechanically driven sweeps which scrape over the ends of the pipe and dislodge wads of cotton therefrom.

3. A cotton salvaging machine composed of a self propelled tractive implement having a frame body, an engine therein, a cotton cleaner having an inlet pipe and an outlet pipe mounted in said body, and a cotton receiving cage mounted on said body frame, a plurality of suction fans having inlet pipes and outlet pipes mounted on said body and operatively connected to said engine and a blower fan having an inlet pipe and an outlet pipe mounted on said body and operated by said engine, a subframe pivotally attached to the front end of said body, a plurality of oval shaped open topped vertically extending hoods mounted on said subframe in transversely spaced relation and aligned with cotton plant rows in the field to be traversed, said hoods having flexible rear bottom edges disposed close to ground level, vertically extending suction pipes having their lower ends near the surface of the earth, and disposed within the rear portion of said hoods, connected to the inlet pipes of said suction fans, pipes connecting the outlet pipes of said suction fans to the inlet of said cotton cleaner and a pipe connecting the outlet pipe of said cotton cleaner with said cotton receiving cage; blow pipes connected to the outlet pipe of said blower fan and opening slightly above ground level at the rear of each hood to direct a stream of air over the earth covered by said hoods and adapted to lift cotton tufts from the ground and urge them toward the open ends of said suction pipes; blow pipes connected to said blower fan having outlet openings disposed to direct a draft of air transversely over the ground between said hoods and carry cotton tufts toward said suction pipe openings.

4. The machine as described in claim 3 wherein the hoods are attached to and supported on the pivotally attached subframe at the front of said frame body whereby the lower edges of said hoods are vertically adjustable relative to the surface of the earth over which the machine travels.

References Cited in the file of this patent
UNITED STATES PATENTS

| | | |
|---|---|---|
| 1,400,522 | Cannon | Dec. 20, 1921 |
| 2,673,436 | Urban | Mar. 30, 1954 |
| 2,707,364 | Wagnon | May 3, 1955 |